United States Patent
Yoshikawa et al.

(10) Patent No.: US 8,663,809 B2
(45) Date of Patent: Mar. 4, 2014

(54) SURFACE MATERIAL SUBSTRATE, SURFACE MATERIAL AND MOLDED BODY

(75) Inventors: Kazuhito Yoshikawa, Moriyama (JP); Takashi Tokiwa, Moriyama (JP)

(73) Assignee: Japan Vilene Company, Ltd., Tokyo (JP)

( * ) Notice: Subject to any disclaimer, the term of this patent is extended or adjusted under 35 U.S.C. 154(b) by 311 days.

(21) Appl. No.: 13/045,720

(22) Filed: Mar. 11, 2011

(65) Prior Publication Data

US 2011/0223438 A1    Sep. 15, 2011

(30) Foreign Application Priority Data

Mar. 12, 2010   (JP) ................................ P2010-055766

(51) Int. Cl.
*B32B 27/08*        (2006.01)

(52) U.S. Cl.
USPC .......................................................... 428/507

(58) Field of Classification Search
None
See application file for complete search history.

(56) References Cited

U.S. PATENT DOCUMENTS 7,837,009 B2 *  11/2010  Gross et al. ................... 181/290

FOREIGN PATENT DOCUMENTS

| JP | 7-030515 | 11/1988 |
|----|----------|---------|
| JP | 7072394 | 5/1989 |
| JP | 6-278260 | 10/1994 |
| JP | 6-278620 | 10/1994 |
| JP | 3212853 | 5/1997 |
| JP | 2009-78375 | 4/2009 |

* cited by examiner

*Primary Examiner* — Sheeba Ahmed
(74) *Attorney, Agent, or Firm* — K&L Gates LLP

(57) ABSTRACT

A surface material substrate has one surface of a fiber substrate containing cellulosic fiber is bonded with an acrylic resin binder containing a flame retardant and a thermosetting resin, a fineness of fiber constituting the fiber substrate is 2.2 dtex or less, and a mass ratio of the acrylic resin to the thermosetting resin is 80:20 to 65:35. A surface material is provided with an adhesive layer containing a resin with a melting point of 200° C. or less on a surface of the fiber substrate of the surface material substrate opposite to a facing surface, which is bonded with the acrylic binder. In a molded body, the surface material is integrated with a substrate mat by heat molding via an adhesive layer. The surface material substrate simultaneously fulfills requirements of low weight and cost, design properties, flame retardancy, mold releasability, followability and trimming properties.

7 Claims, No Drawings

SURFACE MATERIAL SUBSTRATE, SURFACE MATERIAL AND MOLDED BODY

BACKGROUND OF THE INVENTION

1. Field of the Invention

The present invention relates to a substrate for a surface material, to a surface material and to a molded body. More specifically, it relates to a surface material substrate, surface material and molded body with excellent design properties, flame retardancy, mold releasability, followability and trimming properties, which can be used favorably as a surface material substrate, surface material and molded body for automotive applications.

2. Related Background Art

Conventionally, needle-punched nonwoven fabric impregnated with vinyl chloride binder, acrylic binder or polyester binder has been used as surface materials for automobile insulators (Patent Documents 1 to 4). Such a surface material is molded as a unit with a substrate mat consisting of resin felt, cardboard, plastic foam, fiberglass resin composite, wood stock or rigid nonwoven fabric for use in various automotive parts. One method of molding such a surface material with a substrate mat as a unit is by heat pressing. This heat pressing is a molding method in which the surface material and substrate mat are integrated together by using a pair of molds to apply heat and pressure to the laminated surface material and substrate mat. The resulting integrated molded body can then be trimmed around the edges with a blade and used for various automotive parts.

When using a surface material impregnated with a vinyl chloride binder, it has happened that the surface material sticks to the mold during heat pressing when the surface material and substrate mat are molded as a unit by such a heat press method, resulting not only in poor mold releasability but also in poor followability of the surface material to the shape of the mold, causing delamination and wrinkling due to peeling of the substrate mat, and detracting from the surface quality.

As in the case of the vinyl chloride binder, the surface material may also stick to the mold when using a surface material impregnated with an acrylic binder, detracting from the mold releasability, and the surface material may be pulled or shredded by the cutting blade when the molded body is trimmed around the edges with a blade after being molded as a unit, so that the surface material and substrate mat separate from the shredded areas. In other words, the trimming properties have been poor.

In the case of a surface material impregnated with a polyester binder, the surface material may stick to the mold during heat pressing as it does when using a vinyl chloride binder, resulting in poor mold releasability. In any of these cases, the necessary flame retardancy for automotive use may not be satisfied depending on the types of materials constituting the substrate mat and/or whether or not a flame retardant is used.

Therefore, the inventors of the present application have proposed "a substrate for a surface material, wherein one surface of a fiber substrate containing cellulosic fibers is bonded by a polyester resin binder containing a flame retardant and a thermosetting resin" (Patent Document 5). This substrate for a surface material had excellent design properties, flame retardancy, mold releasability, followability and trimming properties.

Patent Document 1: Japanese Patent Publication No. H7-030515 (Claims, Column 4 Lines 8 to 20)
Patent Document 2: Japanese Patent No. 3212853 (Claims, paragraphs 0022 to 0023)
Patent Document 3: Japanese Patent Application Laid-open No. H6-278260 (paragraph 0033)
Patent Document 4: Japanese Patent Publication No. H7-072394 (Claims, column 4 lines 29 to 32)
Patent Document 5: Japanese Patent Application Laid-open No. 2009-78375 (Claims)

SUMMARY OF THE INVENTION

However, in cases where the basis weight of the substrate for a surface material proposed by the applicants of the present application has been reduced in order to achieve weight and cost reductions in recent years, when the substrate for a surface material is molded as a unit with a substrate mat, the surface material becomes transparent and the substrate mat shows through, detracting from the design properties.

The inventors of the present application tried to resolve this problem by using a fiber of a finer grade or in other words a finer fiber as the constituent fiber of the fiber substrate so that the surface material would not be transparent. This was successful in terms of preventing transparency, but created a new problem in terms of trimming properties, perhaps due to the fineness of the fibers and the thinness of the surface material substrate.

To resolve the trimming problem, we then tried increasing the amount of polyester resin binder. This solved the trimming problem, but created a new problem of poor mold releasability due to the increased amount of binder.

Thus, it has been difficult to simultaneous achieve low weight and cost while providing good design properties, flame retardancy, mold releasability, followability and trimming properties with conventional surface material substrates.

These problems associated with reduced weight are not limited to automotive applications, but have also occurred when surface materials for design purposes are heat pressed with substrate mats having acoustic properties, thermal insulating properties and/or cushioning properties and the like to manufacture molded bodies.

In light of these circumstances, it is an object of the present invention to provide a surface material substrate that simultaneously fulfills the requirements of low weight, low cost, design properties, flame retardancy, mold releasability, followability and trimming properties, along with a surface material using this substrate and a molded body integrated with a substrate mat.

The one aspect of the present invention is that surface material substrate, wherein one surface of a fiber substrate containing cellulosic fiber is bonded with an acrylic resin binder containing a flame retardant and a thermosetting resin, a fineness of fiber constituting the fiber substrate is 2.2 dtex or less, and a mass ratio of the acrylic resin to the thermosetting resin is 80:20 to 65:35.

Because it contains cellulosic fibers as constituent fibers of the fiber substrate and contains a flame retardant in the acrylic resin binder, the surface material substrate, can be used to manufacture a surface material having flame retardancy suited to the application. Because it contains a thermosetting resin in addition to the acrylic resin used for the binder, moreover, the tackiness of the acrylic resin is controlled during molding, thereby preventing the surface material from sticking to the mold and providing excellent mold releasability. Because the acrylic resin binder contains a thermosetting resin and the mass ratio of the acrylic resin binder to the thermosetting resin is 80:20 to 65:35, which is higher than the usual proportion of thermosetting resin, the surface material can have a stiffer drape, thereby preventing it from being pulled during trimming, and the surface material can be manufactured with excellent trimming properties. Because the acrylic resin softens to an appropriate degree during heat pressing or other molding, moreover, it has good mold followability, and can be integrated with the substrate mat without delamination or wrinkling. In addition, because the fineness of the constituent fiber in the fiber substrate is 2.2 dtex or less, the number of fibers per unit volume can be increased, so that even if the basis weight of the fiber substrate is reduced in order to save weight and costs, the surface material does not become transparent when molded together with the substrate mat, resulting in a molded body with excellent design properties.

The other aspect of the present invention is that a surface material provided with an adhesive layer containing a resin with a melting point of 200° or less on a surface of the fiber substrate of the surface material substrate opposite to the facing surface, which is bonded with the acrylic resin binder".

Because the surface material uses the aforementioned surface material substrate, it can of course satisfy all the requirements of light weight, low cost, design properties, flame retardancy, mold releasability, followability and trimming properties simultaneously, and because an adhesive layer containing resin with a melting point of 200° C. or less is provided on the surface of the fiber substrate of the surface material substrate opposite the facing surface, which is bonded with the acrylic resin binder, the surface material can be integrated reliably with a substrate mat by the action of the adhesive layer during heat molding.

It is preferable that the surface material, having a basis weight of 30 to 80 g/m$^2$".

The surface material simultaneously satisfies the requirements of design properties, flame retardancy, mold releasability, followability and trimming properties, despite having a low basis weight of 30 to 80 g/m$^2$.

The other aspect of the present invention is that a molded body, wherein the surface material and a substrate mat are integrated together by heat molding via the adhesive layer".

The molded body uses this surface material, it is a molded body providing superior flame retardancy, superior productivity because of its excellent mold releasability, and superior surface quality because of its superior mold followability. Because it can be manufactured with good trimming properties, moreover, it is a molded body in which the surface material does not separate from the substrate mat. Because the surface material and substrate mat are integrated together by heat molding via the adhesive layer, moreover, the surface material and substrate mat are strongly bonded together as a unit. In addition, because the fineness of the constituent fiber in the fiber substrate is 2.2 dtex or less, the number of fibers per unit volume can be increased, so that even if the basis weight of the fiber substrate is reduced in order to save weight and costs, the surface material does not become transparent when molded together with a substrate mat, resulting in a molded body with excellent design properties.

It is preferable that the molded body can be used as a sound-absorbing material in an automobile engine room.

The molded body provides not only the aforementioned effects of the molded body but also excellent sound absorption when used as a sound-absorbing material in an automobile engine room.

DESCRIPTION OF THE PREFERRED EMBODIMENTS

In the surface material substrate of the present invention, one side of a fiber substrate containing cellulosic fiber is bonded with an acrylic resin binder containing a flame retardant and a thermosetting resin.

The cellulosic fiber constituting the fiber substrate of the present invention has the effect of reducing combustion speed because it is carbonized during combustion. Examples of such cellulosic fibers include rayon fiber, polynosic fiber, cupra fiber, cotton fiber, hemp fiber and the like, but of these cotton or rayon fiber is desirable for reasons of economy, and rayon fiber in particular can be used by preference because of its excellent workability with dye and the like, and because it does not reach a high heat or emit toxic gas even when it combusts. The fineness of this cellulosic fiber is 2.2 dtex or less more preferably 1.7 dtex or less so that even if the fiber substrate is of low basis weight it will not become transparent after heat molding it. There is no particular lower limit on the fineness of the cellulosic fiber, but 0.8 dtex or more is preferred. The length of the cellulosic fiber is also not particularly limited, but is preferably 20 to 80 mm, or more preferably 30 to 70 mm. Such cellulosic fiber preferably constitutes 10 mass % or more, more preferably 15 mass % or more, especially preferably 20 mass % or more of the fiber substrate as a whole, so that it can reduce the combustion speed. In some cases, the fiber substrate may be composed entirely of cellulosic fiber. The cellulosic fiber may include 2 or more kinds of cellulosic fiber of different materials, and in this case the total content is preferably the content described above.

In addition to cellulosic fiber, the fiber substrate of the present invention may contain heat-resistant fiber with a melting point or decomposition point of 200° C. or more. Including such a heat-resistant fiber makes the substrate harder to burn and in some cases more weather resistant. Examples of such heat-resistant fibers include polyester fiber, polyamide fiber, polyvinyl chloride fiber, polyurethane fiber, carbon fiber, fluorine fiber, aramid fiber and the like, and weather-resistant, economical polyester fiber is especially desirable. The fineness of this heat-resistant fiber is 2.2 dtex or less, or preferably 1.7 dtex or less, or more preferably 1.4 dtex or less. There is no particular lower limit to the fineness of the heat-resistant fiber, but 0.8 dtex or more is preferred. The length of the heat-resistant fiber is not particularly limited, but is preferably 20 to 80 mm, or more preferably 30 to 70 mm.

The "melting point" in the present invention is the melting temperature obtained from a differential thermal analysis (DTA) curve obtained by differential thermal analysis as stipulated by JIS K 7121-1987, while the "decomposition point" is the initiation temperature T1 as defined by JIS K 7120-1987 (Testing Methods of Plastics by Thermogravimetry). The "fineness" is a value obtained by method A as stipulated in JIS L 1015:1999, 8.5.1 (Fineness Based on Corrected Mass), while the "fiber length" is a value obtained by the "corrected staple diagram method (B method)" of JIS L 1015:1999, 8.4.1.

The fineness of the fibers constituting the fiber substrate of the present invention is set at 2.2 dtex or less or preferably 1.7 dtex or less so that even when the basis weight has been reduced in order to save weight and costs, the substrate will not become transparent and the design properties will not be affected by heat molding. There is no particular lower limit on the fineness of the constituent fiber in the fiber substrate, but 0.8 dtex or more is preferred.

The fiber substrate of the present invention can be composed of fibers such as those described above, which may be in a woven, knitted or nonwoven form. Of these, a nonwoven fabric is preferred from the standpoint of moldability with the substrate mat, and a needle-punched nonwoven fabric is especially desirable from the standpoint of followability with the substrate mat and strength of the nonwoven fabric. The basis weight of this fiber substrate is not particularly limited and will differ depending on the strength required of the surface material substrate, the type of fiber and the like, but is preferably 15 to 65 g/m² or more preferably 25 to 55 g/m² so as to meet recent demands for light weight and low cost.

In the surface material substrate of the present invention, one surface of a fiber substrate such as that described above is bonded with an acrylic resin binder containing a flame retardant and a thermosetting resin. Including a flame retardant in the acrylic resin binder serves to confer adequate flame retardancy in synergy with the aforementioned cellulosic fiber. The flame retardant is not particularly limited, and may be a phosphorus flame retardant, bromine flame retardant or inorganic flame retardant for example.

More particularly, ammonium phosphate, tricresyl phosphate, triethyl phosphate, tris(β-chloroethyl) phosphate, tris(chloroethyl)phosphate, tris(dichloropropyl) phosphate, cresyl diphenyl phosphate, xylenyl diphenyl phosphate, acidic phosphate esters and nitrogen-containing phosphorus compounds and the like can be used as phosphorus flame retardants.

Tetrabromobisphenol A, 2,2-bis(4-hydroxy-3,5-dibromophenyl) propane, pentabromobenzene, hexabromobenzene, tris(2,3-dibromopropyl) isocyanurate, 2,2-bis(4-hydroxyethoxy-3,5-dibromophenyl) propane, decabromodiphenyl oxide and the like can be used as bromine flame retardants.

In addition, red phosphorus, tin oxide, antimony trioxide, zirconium hydroxide, barium metaborate, aluminum hydroxide, magnesium hydroxide and the like can be use as inorganic flame retardants. One such flame retardant or a combination of two or more can be used.

The content of such a flame retardant is preferably such that the mass ratio (as solids) of acrylic resin to flame retardant is between 20:80 and 70:30. If there are more than 80 parts of flame retardant per 20 parts of acrylic resin, the trimming properties will tend to decline, while if there are fewer than 30 parts of flame retardant per 70 parts of acrylic resin, the flame retardancy will tend to be inadequate, so the mass ratio of acrylic resin to flame retardant is more preferably between 30:70 and 60:40.

The acrylic resin binder of the present invention contains a thermosetting resin in addition to the flame retardant described above. Including a thermosetting resin helps to prevent the acrylic resin and flame retardant from becoming tacky during molding, thereby preventing the surface material from sticking to the mold and providing excellent mold releasability. Because the surface material can have a stiffer drape, moreover, it is possible to prevent the surface material from being pulled by the cutting blade, thereby improving the trimming properties.

Such a thermosetting resin can be any that is hardened by heat during heat molding, without any particular limitations, and epoxy resin, oligoester acrylate, xylene resin, guanamine resin, diallyl phthalate resin, DFK resin, thermosetting resin prepolymers, vinyl ester resin, phenol resin, unsaturated polyester resin, furan resin, polyimide, poly(p-hydroxybenzoic acid), polyurethane, maleic acid resin, melamine resin, urea resin and the like can be used for example. Of these, melamine resin is desirable for its versatility, having excellent water resistance, weather resistance and chemical resistance.

The mass ratio as solids of acrylic resin to this thermosetting resin must be between 80:20 and 65:35. If there are fewer than 20 parts of thermosetting resin per 80 parts of acrylic resin, the trimming properties and mold releasability will be poor, while if there are more than 35 parts of thermosetting resin per 65 parts of acrylic resin, followability of the surface material with the substrate mat during heat molding will be poor, so the mass ratio of acrylic resin to thermosetting resin is preferably between 75:25 and 65:35.

Examples of acrylic resin binders that can be used in the present invention include homopolymers of alkyl esters of acrylic acid or methacrylic acid, and copolymers of ethylenically unsaturated monomers copolymerized with these monomer, and acrylic acid ester copolymers are especially desirable. To achieve good mold releasability, followability and trimming properties, the glass transition temperature (Tg) of the acrylic resin binder is preferably −10° C. to 50° C., or more preferably 0 to 40° C. The glass transition temperature in the present invention is measured in accordance with JIS K7121-1987, and is the midpoint glass transition temperature as read from a DSC curve obtained by heat-flux differential scanning calorimetry (DSC).

In the surface material substrate of the present invention, one surface of the fiber substrate is bonded with an acrylic resin binder containing a flame retardant and a thermosetting resin such as those discussed above. Because the acrylic resin softens to a suitable degree during heat pressing or other heat molding, it has excellent followability with the mold, and can be integrated as a unit with the substrate mat without delamination or wrinkling.

This acrylic resin preferably contains a flame retardant and a thermosetting resin in proportions such as those described above, and the mass ratio of fiber substrate to acrylic resin binder (as solids) is preferably between 90:10 and 60:40. If the amount of acrylic resin binder is less than 10 parts per 90 parts of fiber substrate, the trimming properties and flame retardancy will tend to be poor, while if the amount of acrylic resin binder is more than 40 parts per 60 parts of fiber substrate, the mold releasability will tend to be poor, so the mass ratio of fiber substrate to acrylic resin binder (as solids) is preferably between 80:20 and 65:35.

In addition to the flame retardant and thermosetting resin, the acrylic resin binder may also contain a dye, pigment, surfactant, or oil or water repellant to the extent that these do not detract from the design properties, flame retardancy, mold releasability, followability, and trimming properties.

One surface of the fiber substrate is bonded with such an acrylic resin binder in the surface material substrate of the present invention, but it need not be only one surface of the fiber substrate that is bonded, and the inside of the fiber substrate may also be bonded, as may the other surface of the fiber substrate. In other words, it is sufficient that at least one surface be bonded.

The basis weight of the surface material substrate of the present invention is not particular limited, but is preferably 20 to 70 g/m² or more preferably 30 to 60 g/m² so as to meet recent demands for low weight and reduced cost. Because it is configured as described above, the surface material substrate of the present invention has excellent design properties, flame retardancy, mold releasability, followability and trimming properties even with such a low basis weight.

Basis weight in the present invention is the value defined in JIS L 1096-1999 "Testing Methods for Woven Fabrics," 8.4.2 "Mass per unit area of woven fabric under standard conditions", while thickness is the value measured using a Maeda compressive elasticity tester with a 5 cm² pressure plate and a pressure load of 1.96 kPa.

Such a surface material substrate can be manufactured for example by first forming a fiber substrate using fiber with a fineness of 2.2 dtex or less comprising cellulosic fiber, and then applying an acrylic resin binder with a mass ratio of 80:20 to 65:35 of acrylic resin to thermosetting resin to at least one surface of the fiber substrate to bond the fiber substrate.

The fiber substrate can be formed by ordinary methods, and in the preferred case of a nonwoven fabric, it can be formed by using needles and/or water jet or other fluid jet to entangle a fiber web formed by a dry-lay method such as the carding method or air-lay method, a direct method such as the spun-bonded method or melt blowing method, or a wet method for example. The acrylic resin binder is applied to the fiber substrate by impregnation, coating, spraying or the like, and dried to bond the fiber.

The surface material of the present invention is provided with an adhesive layer containing a resin with a melting point of 200° C. or less on the surface of the fiber substrate of the surface material substrate as discussed above opposite to the facing surface, which has been bonded with the acrylic binder. The surface material can thus be reliably integrated as a unit with a substrate mat by the action of the adhesive layer during heat molding. Because this adhesive layer provides the function of adhesion with the substrate mat, it is preferably on only one side of the surface material. Moreover, the adhesive layer is provided on the surface opposite the facing surface because the facing surface bonded with the acrylic resin binder contributes design properties to the surface material, and because there is no reason for having an adhesive layer on the facing surface, while if one is present it will stick to the mold and detract from the mold releasability.

This adhesive layer contains a resin with a melting point of 200° C. or less (hereunder sometimes called the "adhesive resin") so that the adhesive layer can be integrated as a unit with the substrate mat during heat molding. This adhesive resin preferably has a melting point of 190° C. or less or more preferably 180° C. or less so that it will bond more easily with the substrate mat. If the melting point is too low, however, it will less suitable for applications requiring heat resistance, so the melting point is preferably at least 80° C. or more preferably at least 100° C.

One or two or more of polypropylene, polyethylene (such as high density polyethylene or low density polyethylene), polyvinyl chloride, polyamide and ethylene-vinyl acetate copolymer for example can be used as such adhesive resins. Of these, polypropylene is preferred because of its relatively high melting point and excellent adhesiveness.

Such an adhesive layer may be present in the gaps between fibers constituting the fiber substrate, but is preferably provided as a layer separate from the fiber substrate so as to give it superior adhesiveness with the fiber mat. For example, the adhesive resin is preferably in a fibrous form, laminated on one surface of the fiber substrate. More specifically, it is preferably a fiber sheet (a nonwoven, woven or knitted fabric for example) containing adhesive resin fiber, which is laminated on one surface of the fiber substrate.

A surface material in which the adhesive resin is present in the gaps between fibers of the fiber substrate can be manufactured for example by scattering an adhesive resin powder on the fiber substrate and developing the adhesiveness of the adhesive resin powder, while a surface material having adhesive resin fiber laminated on one surface of a fiber substrate can be manufactured by first scattering the adhesive resin fiber on the fiber substrate, and then entangling the fibers with a needle or the like and/or developing the adhesiveness of the adhesive resin fibers, and a surface material having a fiber sheet containing adhesive resin fiber laminated on one surface of a fiber substrate can be manufactured by laminating the fiber sheet on the fiber substrate, and then entangling the fibers with a needle or the like and/or developing the adhesiveness of the adhesive resin fibers.

The basis weight of the surface material of the present invention is not particularly limited, but is preferably 30 to 80 g/m$^2$ or more preferably 40 to 70 g/m$^2$ so as to meet recent demands for light weight and low cost. Even at such a low basis weight, the surface material of the present invention has excellent design properties, flame retardancy, mold releasability, followability and trimming properties because it has the configuration described above. The thickness of the surface material is also not particularly limited, but is preferably 0.4 to 2 mm or more preferably 0.6 to 1.8 mm.

In the surface material of the present invention, the adhesive layer can be formed after the one surface of the fiber substrate has been bonded with the acrylic resin binder to form the facing surface, or the adhesive layer can be formed on the fiber substrate before bonding with the acrylic resin binder, after which the facing surface is formed by bonding with the acrylic resin binder.

The molded body of the present invention comprises a surface material such as that described above, integrated by heat molding with a substrate mat via an adhesive layer. Because this molded body uses the aforementioned surface material, it is lightweight and inexpensive, is highly flame retardant, has excellent productivity because of its superior mold releasability, and has excellent surface quality because of its excellent followability. Because it can be manufactured with good trimming properties, moreover, there is no peeling between surface material and substrate mat in the molded body. Because the surface material and substrate mat are integrated by heat molding via an adhesive layer, moreover, the surface material and substrate mat are strongly bonded together. Because the fineness of the constituent fiber in the fiber substrate is 2.2 dtex or less, moreover, the surface material is not made transparent by heat molding even if the surface material has been given a low basis weight in order to save on weight and costs, resulting in a molded body with excellent design properties.

The substrate mat is not particularly limited and will differ according to the intended application of the molded body, but for example a resin-impregnated glass wool mat, felt, rock wool mat, resin felt, or a polyurethane, polystyrene or polyolefin resin foam or the like can be used. All of these substrate mats have excellent sound absorption.

In the molded body of the present invention, such a substrate mat is integrated as a unit with the aforementioned surface material by heat molding via an adhesive layer. Such a molded body is manufactured by disposing the adhesive layer of the surface material in contact with the substrate mat, and heat molding them for example by pressing between a pair of heated molds. The heating temperature is not particularly limited, and will differ according to the type of adhesive resin, the heat resistance of the substrate mat, the heat resistance of the surface material substrate and the like, but is normally about 200° C. The pressing force is not particularly limited, and can be such as to achieve the desired molded form.

The molded body of the present invention can be used for example as a sound-absorbing material in the engine rooms of automobiles, industrial machinery, construction machinery and the like, and as an architectural sound-absorbing material in apartments, houses, schools, hospitals, libraries and the like, and using a substrate mat with particularly good sound-absorbing properties, it is especially useful as a sound-absorbing material in the engine rooms of automobiles.

EXAMPLES

Examples of the present invention are explained below, but the present invention is not limited to these examples.

Examples 1 to 4, Comparative Examples 1 to 4

(1) Manufacture of Fiber Webs for Fiber Substrates

The rayon fibers and polyester fibers shown in Table 1 were mixed in the mass proportions shown in Table 1, and carded with a carding machine to form fiber webs for fiber substrates.

TABLE 1

| | PET-A[#1] | Rayon-A[#2] | PET-B[#3] | Rayon-B[#4] | Web basis weight (g/m²) |
|---|---|---|---|---|---|
| Example 1 | 75 | 25 | — | — | 38 |
| Example 2 | 75 | 25 | — | — | 38 |
| Example 3 | 80 | 20 | — | — | 30 |
| Example 4 | 80 | 20 | — | — | 30 |
| Example 5 | 75 | 25 | — | — | 38 |
| Example 6 | 75 | 25 | — | — | 38 |
| Example 7 | 75 | 25 | — | — | 38 |
| Comp. Example 1 | — | — | 80 | 20 | 30 |
| Comp. Example 2 | 80 | 20 | — | — | 30 |
| Comp. Example 3 | 80 | 20 | — | — | 30 |
| Comp. Example 4 | 80 | 20 | — | — | 30 |
| Comp. Example 5 | — | — | 75 | 25 | 38 |
| Comp. Example 6 | 75 | 25 | — | — | 38 |
| Comp. Example 7 | 75 | 25 | — | — | 38 |
| Comp. Example 8 | 75 | 25 | — | — | 38 |

[#1] Polyester fiber, fineness 1.4 dtex, length 38 mm (Huvis Corp., Huvis Ester black)
[#2] Rayon fiber, fineness 1.7 dtex, length 51 mm (Lenzing Fibers, Lenzing 9001 BK)
[#3] Polyester fiber, fineness 2.2 dtex, length 51 mm (Oyama Chemical, Oyama Ester BL)
[#4] Rayon fiber, fineness 3.3 dtex, length 60 mm (Lenzing Fibers, Lenzing 9001 BK)

(2) Manufacture of Fiber Web for Adhesive Layer

The fibers shown in Table 2 were mixed in the proportions shown in Table 2, and carded with a carding machine or formed by the spunbonded method into a fiber web for the adhesive layer.

TABLE 2

| | PP[#1] | PET[#2] | Rayon[#3] | PP-S[#4] | Basis weight (g/m²) |
|---|---|---|---|---|---|
| Example 1 | 100 | — | — | — | 12 |
| Example 2 | — | — | — | 1 | 12 |
| Example 3 | 80 | 10 | 10 | — | 20 |
| Example 4 | 80 | 10 | 10 | — | 20 |
| Example 5 | 100 | — | — | — | 12 |
| Example 6 | 100 | — | — | — | 12 |
| Example 7 | 100 | — | — | — | 12 |
| Comp. Example 1 | 80 | 10 | 10 | — | 20 |
| Comp. Example 2 | 80 | 10 | 10 | — | 20 |
| Comp. Example 3 | 80 | 10 | 10 | — | 20 |
| Comp. Example 4 | 80 | 10 | 10 | — | 20 |
| Comp. Example 5 | 100 | — | — | — | 12 |
| Comp. Example 6 | 100 | — | — | — | 12 |
| Comp. Example 7 | 100 | — | — | — | 12 |
| Comp. Example 8 | 100 | — | — | — | 12 |

[#1] Polypropylene fiber, fineness 3.3 dtex, length 64 mm (Chisso Corp. Chisso RP030 Black, melting point 160° C.)
[#2] Polyester fiber, fineness 1.4 dtex, length 38 mm (Huvis Corp., Huvis Ester black, melting point 260° C.)
[#3] Rayon fiber, fineness 1.7 dtex, length 51 mm (Lenzing Fibers, Lenzing 9001 BK)
[#4] Polypropylene resin spunbonded nonwoven (melting point 160° C., basis weight 20 g/m², thickness 0.2 mm)

(3) Preparation of Resin Binders

Acrylic resin binders or polyester resin binders were compounded with the proportions of solids shown in Table 3.

TABLE 3

| | PET[#1] | AC-1[#2] | AC-2[#3] | TSR[#4] | FR[#5] | R1[#6] | R2[#7] |
|---|---|---|---|---|---|---|---|
| Ex. 1 | — | 5.5 | — | 2.2 | 4.0 | 58:42 | 71:29 |
| Ex. 2 | — | 5.5 | — | 2.2 | 4.0 | 58:42 | 71:29 |
| Ex. 3 | — | 5.5 | — | 2.2 | 4.0 | 58:42 | 71:29 |
| Ex. 4 | — | — | 5.5 | 2.2 | 4.0 | 58:42 | 71:29 |
| Ex. 5 | — | 5.5 | — | 2.2 | 4.0*[5] | 58:42 | 71:29 |
| Ex. 6 | — | 5.5 | — | 1.4 | 4.0 | 58:42 | 80:20 |
| Ex. 7 | — | 5.5 | — | 3.0 | 4.0 | 58:42 | 65:35 |
| CE 1 | 4.2 | — | — | 0.9 | 6.3 | 40:60 | 82:18 |
| CE 2 | 4.2 | — | — | 0.9 | 6.3 | 40:60 | 82:18 |
| CE 3 | 5.5 | — | — | 1.1 | 8.2 | 40:60 | 83:17 |
| CE 4 | — | 5.5 | — | 1.1 | 8.2 | 40:60 | 83:17 |
| CE 5 | — | 5.5 | — | 2.2 | 4.0 | 58:42 | 71:29 |
| CE 6 | 5.5 | — | — | 2.2 | 4.0 | 58:42 | 71:29 |
| CE 7 | — | 5.5 | — | 1.0 | 4.0 | 58:42 | 85:15 |
| CE 8 | — | 5.5 | — | 3.7 | 4.0 | 58:42 | 60:40 |

[#1] Polyester resin emulsion (Nagase & Co. RESIN VF-1, Tg = 15° C.)
[#2] Acrylic resin emulsion (Nippon Zeon LX-851F2, Tg = 15° C.)
[#3] Acrylic resin emulsion (DIC Corp. JT-80, Tg = 30° C.)
[#4] Melamine resin (Dainippon Ink and Chemicals, Inc., Bekkamin J-103 thermosetting resin)
[#5] Pentabromobenzene (Marubishi Oil Chemical, Nonnen SMC-65 flame retardant)
*[5] Ammonium phosphate (Marubishi Oil Chemical, Nonnen SMC-95 flame retardant)
[#6] Mass ratio of acrylic resin and flame retardant
[#7] Mass ratio of acrylic resin and thermosetting resin (4) Manufacture of Surface Material A fiber web for the adhesive layer was laminated on only one surface of the fiber web for the fiber substrate, and this was needle punched at a needle density of 170 needles/cm² or 90 needles/cm² (Example 2 only) from the side of the fiber web for the fiber substrate, to manufacture the needle-punched laminated nonwoven fabrics shown in Table 4.

Next, the resin binder (3) above was foamed and applied only to the surface of the fiber web for the fiber substrate in the needle punched laminated nonwoven fabric, which was then dried in a dryer set to 140° C. to manufacture a surface material.

TABLE 4

| | Needle-punched laminated nonwoven fabric | | Surface material | | | |
|---|---|---|---|---|---|---|
| | Basis weight (g/m²) | Thickness (mm) | R3# | Amount of binder (g/m²) | Basis weight (g/m²) | Thickness (mm) |
| Ex. 1 | 50 | 2.1 | 74:26 | 13 | 63 | 1.1 |
| Ex. 2 | 50 | 2.2 | 74:26 | 13 | 63 | 1.2 |
| Ex. 3 | 50 | 2.1 | 70:30 | 13 | 63 | 1.1 |
| Ex. 4 | 50 | 2.1 | 70:30 | 13 | 63 | 1.1 |
| Ex. 5 | 50 | 2.1 | 74:26 | 13 | 63 | 1.1 |
| Ex. 6 | 50 | 2.1 | 76:24 | 12.2 | 62.2 | 1.1 |
| Ex. 7 | 50 | 2.1 | 73:27 | 13.8 | 63.8 | 1.1 |

TABLE 4-continued

| | Needle-punched laminated nonwoven fabric | | | Surface material | | |
|---|---|---|---|---|---|---|
| | Basis weight (g/m$^2$) | Thickness (mm) | R3# | Amount of binder (g/m$^2$) | Basis weight (g/m$^2$) | Thickness (mm) |
| CE 1 | 50 | 2.1 | 70:30 | 13 | 63 | 1.1 |
| CE 2 | 50 | 2.1 | 70:30 | 13 | 63 | 1.1 |
| CE 3 | 50 | 2.2 | 66:34 | 15.6 | 65.6 | 1.2 |
| CE 4 | 50 | 2.2 | 66:34 | 15.6 | 65.6 | 1.2 |
| CE 5 | 50 | 2.1 | 74:26 | 13 | 63 | 1.1 |
| CE 6 | 50 | 2.1 | 74:26 | 13 | 63 | 1.1 |
| CE 7 | 50 | 2.1 | 76:24 | 11.8 | 61.8 | 1.1 |
| CE 8 | 50 | 2.1 | 72:28 | 14.5 | 64.5 | 1.1 |

Mass ratio of fiber substrate to resin binder (as solids)

(5) Performance Evaluation (5)-1 Flame Retardancy

The flame retardancy of the surface material was measured in accordance with the flammablity testing requirements of the US Federal Motor Vehicle Safety Standard FMVSS No. 302. Such flammablity testing was carried out at 5 pieces on each surface material, which was then evaluated according to the following standard. The results are shown in Table 5.

○ No surface material had a combustion speed exceeding 100 mm/min

X Some surface material had a combustion speed exceeding 100 nm/min (5)-2 Mold Releasability Molten glass was blown by centrifugal force to form fiber that was then aggregated and bounded with phenol resin to prepare glass wool mat (basis weight 500 g/m$^2$) as the substrate mat.

The fiber web for the adhesive layer of the surface material was then laid over one surface of the substrate mat in contact with the mat, and pressed for 90 seconds with a pair of molds (maximum depth 10 cm) heated to 200° C. to mold the shape of an engine room silencer. The molded body was removed from the pair of molds and evaluated according to the following standard based on fluff formation on the surface material and adhesion of fiber and/or resin to the molds. The results are as shown in Table 5.

○ No apparent fluffing of the surface material surface and adhesion of fiber or resin to the molds X Fluffing of the surface material surface and adhesion of fiber and/or resin to the molds (5)-3 Followability Following manufacture of the molded bodies in the (5)-2 (mold releasability) test above, the molded bodies were checked for insufficient following of the surface material to the substrate mat, and for delamination and wrinkles caused by peeling from the glass wool mat, and evaluated according to the following standard. The results are as shown in Table 5.

○ No apparent delamination or wrinkling

X Delamination and/or wrinkling observed (5)-4 Trimming Properties

The edges of the molded bodies manufactured in the (5)-2 (mold releasability) test above were punched out with a punching machine using a form with a trimming blade. The quality of trimming was evaluated according to pulling of the surface material and the degree to which the pulled surface material stuck to the substrate mat, using the following evaluation standard. The results are as shown in Table 5.

○ Unprominent pulling towards the glass wool and adhesion of fiber at the edge of the molded body X Prominent pulling towards the glass wool and adhesion of fiber at the edge of the molded body (5)-5 Design Properties The surface design properties of the molded bodies manufactured in the (5)-4 trimming test above were evaluated according to the degree of transparency of the surface material, using the following evaluation standard. The results are as shown in Table 5 below.

○ Unprominent transparency on the molded body surface design area

X Prominent transparency on the molded body surface design area (5)-6 Adhesiveness Adhesiveness between the surface material and substrate mat in the molded bodies manufactured in the (5)-4 trimming test above was evaluated according to the degree of peeling between the surface material and the substrate mat, using the following evaluation standard. The results are as shown in Table 5 below.

○ No peeling of the surface material from the substrate mat in the molded body

X Peeling of the surface material from the substrate mat in the molded body

TABLE 5

| | Flame retardancy | Mold releasability | Followability | Trimming properties | Design properties | Adhesiveness |
|---|---|---|---|---|---|---|
| Ex. 1 | ○ | ○ | ○ | ○ | ○ | ○ |
| Ex. 2 | ○ | ○ | ○ | ○ | ○ | ○ |
| Ex. 3 | ○ | ○ | ○ | ○ | ○ | ○ |
| Ex. 4 | ○ | ○ | ○ | ○ | ○ | ○ |
| Ex. 5 | ○ | ○ | ○ | ○ | ○ | ○ |
| Ex. 6 | ○ | ○ | ○ | ○ | ○ | ○ |
| Ex. 7 | ○ | ○ | ○ | ○ | ○ | ○ |
| CE 1 | ○ | ○ | ○ | ○ | X | ○ |
| CE 2 | ○ | ○ | ○ | X | ○ | ○ |
| CE 3 | ○ | X | ○ | ○ | ○ | ○ |
| CE 4 | ○ | X | ○ | ○ | ○ | ○ |
| CE 5 | ○ | ○ | ○ | ○ | X | ○ |
| CE 6 | ○ | ○ | X | ○ | ○ | ○ |
| CE 7 | ○ | X | ○ | ○ | ○ | ○ |
| CE 8 | ○ | ○ | X | ○ | ○ | ○ |

The following can be seen from Table 5.

1. It appears from a comparison of Example 1 and Comparative Example 5 that if the fineness of the fibers constituting the fiber substrate is 2.2 dtex or less, the surface material does not become transparent, and the design properties are superior.

2. It appears from a comparison of Example 1 and Comparative Example 6 that superior followability during heat molding is achieved by using an acrylic resin binder.

3. It appears from a comparison of Example 6 and Comparative Example 7 and a comparison of Example 7 and Comparative Example 8 that excellent mold releasability and followability are achieved if the mass ratio of acrylic resin to thermosetting resin is between 80:20 and 65:35.

4. Excellent flame retardancy unaffected by the type of flame retardant is seen in Example 1 and Example 5.

5. In Example 1 and Example 2, the surface material and substrate mat are strongly bonded together with no effect from the type of adhesive layer.

Because the surface material of the present invention has good design properties, excellent flame retardancy, mold releasability, followability and trimming properties, a molded body using this surface material can be used as a sound-absorbing material in the engine rooms of automobiles, industrial machinery, construction machinery and the like, and as an architectural acoustic material in apartments, houses, schools, hospitals, libraries and the like, and using a substrate mat with particularly good acoustic properties, it is especially useful as a sound-absorbing material in the engine rooms of automobiles.

What is claimed is:

1. A surface material substrate, wherein one surface of a fiber substrate containing cellulosic fiber is bonded with an acrylic resin binder containing a flame retardant and a melamine resin, a fineness of fiber constituting the fiber substrate is 2.2 dtex or less, and a mass ratio of the acrylic resin to the melamine resin is 80:20 to 65:35.

2. A surface material provided with an adhesive layer containing a resin with a melting point of 200° C. or less on a surface of the fiber substrate of the surface material substrate according to claim 1 opposite to the facing surface, which is bonded with the acrylic resin binder.

3. The surface material according to claim 2, having a basis weight of 30 to 80 g/m2.

4. A molded body, wherein the surface material according to claim 2 and a substrate mat are integrated together by heat molding via the adhesive layer.

5. A molded body, wherein the surface material according to claim 3 and a substrate mat are integrated together by heat molding via the adhesive layer.

6. The molded body according to claim 4, for use as a sound-absorbing material in an automobile engine room.

7. The molded body according to claim 5, for use as a sound-absorbing material in an automobile engine room.

* * * * *